United States Patent
Corrion (10) Patent No.: US 9,118,662 B2
(45) Date of Patent: Aug. 25, 2015

(54) METHOD AND SYSTEM FOR DISTRIBUTED OFF-LINE LOGON USING ONE-TIME PASSWORDS

(75) Inventor: Bradley W. Corrion, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 23 days.

(21) Appl. No.: 13/976,044

(22) PCT Filed: Dec. 27, 2011

(86) PCT No.: PCT/US2011/067399
§ 371 (c)(1),
(2), (4) Date: Jun. 26, 2013

(87) PCT Pub. No.: WO2013/100905
PCT Pub. Date: Jul. 4, 2013

(65) Prior Publication Data
US 2014/0201517 A1    Jul. 17, 2014

(51) Int. Cl.
*G06F 21/62* (2013.01)
*H04L 29/06* (2006.01)
*H04W 12/06* (2009.01)
*H04L 9/32* (2006.01)
*G06F 21/64* (2013.01)

(52) U.S. Cl.
CPC .......... *H04L 63/0838* (2013.01); *H04L 9/3228* (2013.01); *H04L 63/0884* (2013.01); *H04W 12/06* (2013.01); *H04L 2209/80* (2013.01)

(58) Field of Classification Search
CPC ............ G06Q 20/3276; H04L 9/0656; H04W 74/002; G06F 21/6209
See application file for complete search history.

(56) References Cited

U.S. PATENT DOCUMENTS

| | | | |
|---|---|---|---|
| 7,773,754 B2* | 8/2010 | Buer et al. ................. 380/277 |
| 2006/0097041 A1 | 5/2006 | Funamoto et al. |
| 2007/0203850 A1 | 8/2007 | Singh et al. |
| 2010/0082490 A1 | 4/2010 | Rosenblatt et al. |
| 2011/0026716 A1 | 2/2011 | Tang et al. |
| 2011/0302083 A1 | 12/2011 | Bhinder |

FOREIGN PATENT DOCUMENTS

WO   2013100905 A1   7/2013

OTHER PUBLICATIONS

A Framework for Secure Single Sign-On. David et al. IACR Crytography(2011).*
International Search Report and Written Opinion received for International Patent Application No. PCT/US2011/067399, mailed Sep. 21, 2012, 9 pages.
Intel Corporation, "Technology Brief: Intel® Identity Protection Technology," 2011, 2 pages.

* cited by examiner

Primary Examiner — Venkat Perungavoor
(74) Attorney, Agent, or Firm — Barnes & Thornburg LLP (57) ABSTRACT

A method and a system for extending distributed logon services to an off-line computing device includes encrypting, on the off-line computing device, a one-time password (OTP), a nonce, and a unique identifier to generate an authorization request message. Using a mobile device as a proxy to forward the authorization request message to an access control server for authorization. Decrypting the authorization response message to obtain the nonce. Re-encrypting the nonce to generate an authorization response message. Using the mobile device as a proxy to forward the authorization response message to the off-line computing device. Decrypting the authorization response message to obtain the nonce. Comparing the nonce obtained from the authorization response message with the original nonce. The computing device to permit or deny access as result of comparing the nonce obtained from the authorization response message with the original nonce.

18 Claims, 5 Drawing Sheets

METHOD AND SYSTEM FOR DISTRIBUTED OFF-LINE LOGON USING ONE-TIME PASSWORDS

BACKGROUND

Computing devices have become ubiquitous with everyday life so much so that it is not uncommon for a person to interact with a large number of such devices throughout the day. For a number of reasons, many of those computing devices are always connected to one or more networks such as the Internet. Such connectivity allows computing devices to receive security patches, software updates, firmware updates, and various other forms of information and data from remote devices and servers.

However, due to a variety of factors, it may not feasible to provide robust connectivity to some devices. Many of these devices have limited or no access to a network, which makes managing and servicing such devices difficult. Moreover, due to their lack of connectivity, many of these devices are not capable of reliably communicating with a remote logon server and, as a result, are often configured using a common username and password. That practice leaves those devices open to a number of security threats because such devices lack the ability to quickly and securely change passwords or revoke a user's authorization.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention implemented in a computer system may include one or more bus-based interconnects or links between components and/or one or more point-to-point interconnects between components. Embodiments of the invention may also be implemented as instructions carried by or stored on a transitory or non-transitory machine-readable medium, which may be read and executed by one or more processors. A machine-readable medium may be embodied as any device, mechanism, or physical structure for storing or transmitting information in a form readable by a machine (e.g., a computing device). For example, a machine-readable medium may be embodied as read only memory (ROM); random access memory (RAM); magnetic disk storage media; optical storage media; flash memory devices; mini- or micro-SD cards, memory sticks, electrical signals, and others.

In the drawings, specific arrangements or orderings of schematic elements, such as those representing devices, modules, instruction blocks and data elements, may be shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

In general, schematic elements used to represent instruction blocks may be implemented using any suitable form of machine-readable instruction, such as software or firmware applications, programs, functions, modules, routines, processes, procedures, plug-ins, applets, widgets, code fragments and/or others, and that each such instruction may be implemented using any suitable programming language, library, application programming interface (API), and/or other software development tools. For example, some embodiments may be implemented using Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others.

Further, in the drawings, where connecting elements, such as solid or dashed lines or arrows, are used to illustrate a connection, relationship or association between or among two or more other schematic elements, the absence of any such connecting elements is not meant to imply that no connection, relationship or association can exist. In other words, some connections, relationships or associations between elements may not be shown in the drawings so as not to obscure the disclosure. In addition, for ease of illustration, a single connecting element may be used to represent multiple connections, relationships or associations between elements. For example, where a connecting element represents a communication of signals, data or instructions, it should be understood by those skilled in the art that such element may represent one or multiple signal paths (e.g., a bus), as may be needed, to effect the communication.

Figure 1:
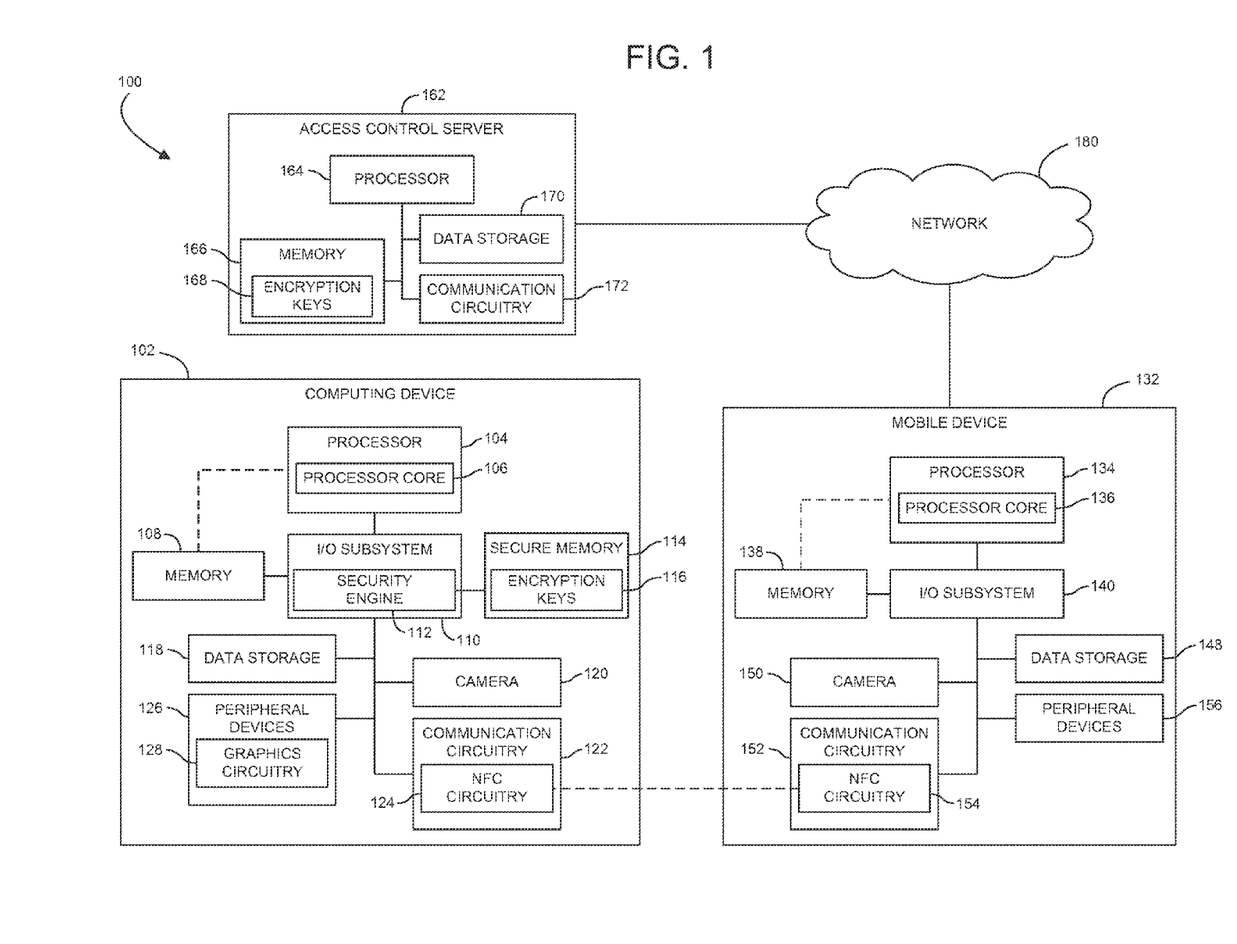
FIG. 1 is a simplified block diagram of at least one embodiment of a system for extending distributed logon services to an off-line computing device.

Referring now to FIG. 1, a system 100 for extending distributed logon services to an off-line device includes a computing device 102 and an access control server 162. In some embodiments, the computing device 102 comprises an "off-line" device having limited or no access to one or more networks such as network 180. Additionally or alternatively, in other embodiments, the off-line computing device 102 may have access to a private network, but not to the network 180. In use, as discussed in more detail below, a mobile device 132 acts as a proxy for the off-line computing device 102 in authenticating a user with the access control server 162. To do so, the off-line computing device 102 generates an authorization request message to be verified by the access control server 162. The off-line computing device 102 generates a visual and/or an electronic representation of the authorization request message, which is thereafter made available to be captured by the mobile device 132. Once obtained, the authorization request message is transmitted by the mobile device 132, acting as a proxy, to the access control server 162 over a network 180. Based on the information contained within the authorization request message, the access control server 162 determines whether access to the off-line computing device 102 should be authorized. In response to determining that access to the off-line computing device 102 is authorized, the access control server 162 generates and transmits an authorization response message to the mobile device 132, which again acts a proxy. Upon receipt, the mobile device 132 generates a visual and/or an electronic representation of the authorization response message, which is thereafter made available to be captured by the off-line computing device 102. The off-line computing device then determines whether access should be permitted based on comparing the information contained within the authorization request message with the information contained within the authorization response message.

The computing device 102 may be embodied as any type of computing device capable of performing the functions described herein. For example, the computing device 102 may be embodied as a desktop computer, a laptop computer, a mobile internet device, a handheld computer, a smart phone, a tablet computer, a personal digital assistant, a telephony device, or other computing device. In one particular embodiment, the computing device 102 is embodied as an automated teller machine. In the illustrative embodiment of FIG. 1, the computing device 102 includes a processor 104, an I/O subsystem 110, a memory 108, a data storage device 118, and one or more peripheral devices 126. In some embodiments, several of the foregoing components may be incorporated on a motherboard of the computing device 102, while other components may be communicatively coupled to the motherboard via, for example, a peripheral port. Furthermore, it should be appreciated that the computing device 102 may include other components, sub-components, and devices commonly found in a computer and/or computing device, which are not illustrated in FIG. 1 for clarity of the description.

The processor 104 of the computing device 102 may be embodied as any type of processor capable of executing software/firmware, such as a microprocessor, digital signal processor, microcontroller, or the like. The processor 104 is illustratively embodied as a single core processor having a processor core 106. However, in other embodiments, the processor 104 may be embodied as a multi-core processor having multiple processor cores 106. Additionally, the computing device 102 may include additional processors 104 having one or more processor cores 106.

The I/O subsystem 110 of the computing device 102 may be embodied as circuitry and/or components to facilitate input/output operations with the processor 104 and/or other components of the computing device 102. In some embodiments, the I/O subsystem 110 may be embodied as a memory controller hub (MCH or "northbridge"), an input/output controller hub (ICH or "southbridge"), and a firmware device. In such embodiments, the firmware device of the I/O subsystem 110 may be embodied as a memory device for storing Basic Input/Output System (BIOS) data and/or instructions and/or other information (e.g., a BIOS driver used during booting of the computing device 102). However, in other embodiments, I/O subsystems having other configurations may be used. For example, in some embodiments, the I/O subsystem 110 may be embodied as a platform controller hub (PCH). In such embodiments, the memory controller hub (MCH) may be incorporated in or otherwise associated with the processor 104, and the processor 104 may communicate directly with the memory 108 (as shown by the hashed line in FIG. 1). Additionally, in other embodiments, the I/O subsystem 110 may form a portion of a system-on-a-chip (SoC) and be incorporated, along with the processor 104 and other components of the computing device 102, on a single integrated circuit chip.

The I/O subsystem 110 may include a Security Engine (SE) 112, which may be embodied as an embedded microprocessor, such as a security co-processor, that operates independently of the processor 104 to provide a secure and isolated environment that cannot be accessed by the processor 104 or other components of the computing device 102. In some embodiments, the SE 112 may manage the storage of one or more encryption keys used by the computing device 102 to secure data and or communications between the computing device 102 and the mobile device 132 and/or the access control server 162. In such embodiments, the one or more encryption keys may be stored in a portion of memory 108 that is accessible to the SE 112 and inaccessible to other components of the computing device 102. In other embodiments, the SE 112 may generate a one-time password (OTP), which as will be discussed in more detail below, is utilized in part to extend distributed logon services to the off-line computing device 102.

The processor 104 is communicatively coupled to the I/O subsystem 110 via a number of signal paths. These signal paths (and other signal paths illustrated in FIG. 1) may be embodied as any type of signal paths capable of facilitating communication between the components of the computing device 102. For example, the signal paths may be embodied as any number of wires, cables, light guides, printed circuit board traces, via, bus, intervening devices, and/or the like.

The memory 108 of the computing device 102 may be embodied as or otherwise include one or more memory devices or data storage locations including, for example, dynamic random access memory devices (DRAM), synchronous dynamic random access memory devices (SDRAM), double-data rate synchronous dynamic random access memory device (DDR SDRAM), mask read-only memory (ROM) devices, erasable programmable ROM (EPROM), electrically erasable programmable ROM (EEPROM) devices, flash memory devices, and/or other volatile and/or non-volatile memory devices. The memory 108 is communicatively coupled to the I/O subsystem 110 via a number of signal paths. Various data and software may be stored in the memory device 108. For example, one or more operating systems, applications, programs, libraries, and drivers that make up the software stack executed by the processor 104 may reside in memory 108 during execution. Furthermore, software and data stored in memory 108 may be swapped between the memory 108 and the data storage device 118 as part of memory management operations.

The computing device 102 may include additional memory devices in other embodiments. For example, the computing device 102 may include secure memory 114, which as discussed in more detail below, may store one or more encryption keys 116 for securing data or communications of the computing device 102. The secure memory 114 may be embodied as an memory device separate from the main memory 108 or may as a secured partition of the memory 108. Although only two memory devices 108, 114 are illustrated in FIG. 1, the computing device 102 may include any number of additional memory devices in other embodiments.

The computing device 102 may also include data storage device(s) 118. The data storage device(s) 118 may be embodied as any type of device or devices configured for the short-term or long-term storage of data such as, for example, memory devices and circuits, memory cards, hard disk drives, solid-state drives, or other data storage devices.

Additionally, the computing device 102 may include communication circuitry 122 to facilitate communication with one or more remote computing devices over the network 180. The computing device 102 may use any suitable communication protocol to communicate with other computing devices over the network 180 depending on, for example, the particular type of network(s) 180. The communication circuitry 122 may include near-field communication (NFC) circuitry 124 in some embodiments. The computing device 102 may use the NFC circuitry 124 to transfer information or data to one or more remote computing devices without using the network 180. For example, the computing device 102 may use the NFC circuitry 124 to transfer information or data to the mobile device 132, which as discussed below, may also include NFC circuitry 154.

In some embodiments, the computing device 102 may include a camera 120 or scanner for capturing a visual image or object displayed by one or more remote computing devices. For example, the computing device 102 may use the camera 120 to capture one or more images displayed by the mobile device 132. The camera 120 may be embodied as any type of camera, such as a still camera, a video camera, or the like, that is capable of generating images displayed by one or more remote computing devices or provided by a user of the computing device 102. In some embodiments, the camera 120 may be incorporated into a housing of the computing device 102 or may be a peripheral device 126 communicatively coupled to the computing device 102. For example, the camera 120 may be incorporated near a display screen of the computing device 102 or positioned in the proximity of the computing device 102.

The peripheral devices 126 of the computing device 102 may include any number of peripheral or interface devices. For example, the peripheral devices 126 may include a display, a touch screen, a keyboard, a mouse, external speakers, and/or other peripheral devices. The peripheral devices 126 are communicatively coupled to the I/O subsystem 110 via a number of signal paths thereby allowing the I/O subsystem 110 and/or processor 104 to receive inputs from and send outputs to the peripheral devices 126. The particular devices included in the peripheral devices 126 may depend upon, for example, the intended use of the computing device 102.

In the illustrative embodiment shown, the peripheral devices 126 includes graphics circuitry 128 embodied as a graphics processing unit of a graphics peripheral card. The graphics processing unit is used to perform various graphics processing functions such as accelerating the generation of graphics and the like. As such, the graphics processing unit is typically used to support the generation of graphics on the computing device 102. However, the graphics processing unit may also be used to process visual images captured by the camera 120 and/or perform other tasks for the computing device 102. For example, the graphics processing unit may execute software/firmware of the computing device in conjunction with or separate from the processor 104. In some embodiments, the processor 104 may also include the graphics circuitry 128 defined on a common die with the processor core 106.

The mobile device 132 may be embodied as any type of portable device capable of performing the proxy functions described below. Similar to the computing device 102, the mobile device 132 may include various components typically found in a portable computer. In the illustrative embodiment of FIG. 1, the mobile device 132 includes a processor 134, a memory 138, an I/O subsystem 140, a data storage device 148, a camera 150, communication circuitry 152, and one or more peripheral devices 156. The communication circuitry 152 may include NFC circuitry 154 for direct communications between the mobile device 132 and the computing device 102 separate from the network 180. As shown in the illustrative embodiment of FIG. 1, the data storage device 148, the camera 150, the communication circuitry 152, and the NFC circuitry 154 may comprise separate components of the mobile device 132. Of course, it should be understood that in other embodiments the peripheral devices 156 may include one or more of the data storage device 148, the camera 150, the communication circuitry 152, and the NFC circuitry 154.

The access control server 162 may be embodied as any type of server capable of performing the authentication functions described herein. The access control server 162 may include various components typically found in a sever computer. In the illustrative embodiment of FIG. 1, the access control server 162 includes a processor 164, a memory 166, a data storage device 170, and communication circuitry 172. The memory 166 may store one or more encryption keys 168 used by the access control server 162 to secure data and/or communications between the access control server 162 and the computing device 102 and/or the mobile device 132. In some embodiments, the memory 166 may store a one-time password (OTP), which may be utilized to facilitate the extension of distributed logon services to the off-line computing device 102.

Figure 2:
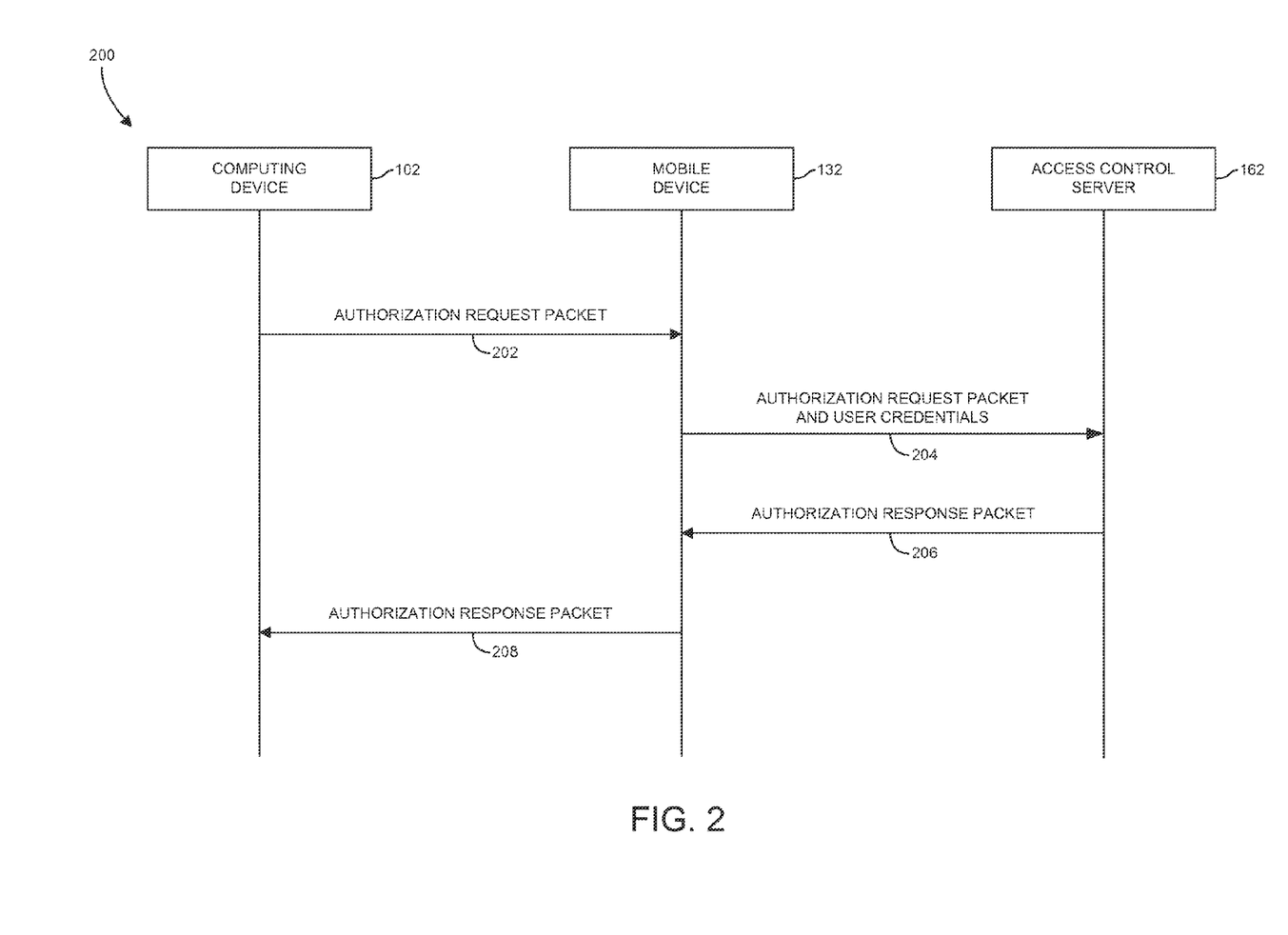
FIG. 2 is a simplified activity flow diagram of at least one embodiment of a method for extending distributed logon services to the off-line computing device of FIG. 1.

Referring now to FIG. 2, an illustrative embodiment of a method 200 for extending distributed logon services to the off-line computing device 102 is shown. In operation, the computing device 102 generates an authorization request packet in response to a user requesting access to the computing device 102. In such embodiments, the user may be requesting access to one or more components of the computing device 102, or the user may be requesting access to one or more functions or programs executing on the computing device 102. To generate the authorization request packet, the computing device 102 may encrypt a one-time password (OTP) generated by the computing device 102, a nonce generated by the computing device 102, and a unique identifier of the computing device 102 using an encryption key. The nonce is embodied as random or pseudo-random number intended to be used only once in cryptographic functions to thwart, for example, replay attacks.

In some embodiments, the computing device 102 shares the generated authorization request packet with the mobile device 132 in data transmission 202. In such embodiments, the computing device 102 may share the generated authorization request packet with the mobile device 132 using a barcode and/or one or more NFC data exchanges.

Upon receiving the generated authorization request packet, the mobile device 132 may obtain user credentials from the user that is requesting access to the computing device 102. The user credentials in some embodiments are unique to the user requesting access to the computing device 102. After obtaining the user credentials from the user, the mobile device 132 transmits the authorization request packet and the user credentials to the access control server 162 over the network 180 in data transmission 204.

The access control server 162, upon receiving the authorization request packet and the user credentials from the mobile device 132, decrypts the authorization request packet using an encryption key to obtain the OTP, the nonce, and the unique identifier of the computing device 102. It should be understood that the encryption key used to decrypt the authorization request packet corresponds to the encryption key that was used to encrypt the authorization request packet. The access control server 162, in some embodiments, verifies the OTP and the unique identifier of the computing device 102. Additionally or alternatively, in some embodiments, the access control server 162 verifies the user credentials obtained by the mobile device 132.

In response to verifying the OTP, the unique identifier of the computing device 102, and the user credentials obtained by the mobile device 132, the access control server 162 re-encrypts the nonce using an encryption key to generate an authorization response packet. It should be understood that the encryption key used to re-encrypt the nonce may be a corresponding key or a different key than the encryption key used to encrypt the OTP, the nonce, and the unique identifier of the computing device 102. After re-encrypting the nonce, the access control server 162 transmits the generated authorization response packet to the mobile device 132 over the network 180 in data transmission 206.

Upon receiving the generated authorization response packet, the mobile device 132 shares the generated authorization response packet with the computing device 102 in data transmission 208. In such embodiments, the mobile device 132 shares the generated authorization response packet with the computing device 102 using a barcode and/or one or more NFC data exchanges. It should be understood that the barcode and/or the one or more NFC data exchanges used by the mobile device 132 to share the authorization response packet with the computing device 102 are different from the barcode and/or the one or more NFC data exchanges used by the computing device 102 to share the authorization request packet with the mobile device 132.

The computing device 102, upon receiving the authorization response packet, decrypts the authorization response packet to obtain the nonce, which was re-encrypted by the access control server 162. It should be understood that the encryption key used to decrypt the authorization response packet corresponds to the encryption key that was used to encrypt the authorization response packet. The computing device 102, in some embodiments, confirms that the nonce that was re-encrypted by the access control server 162 is the same as the nonce that was originally generated by the computing device 102. Thereafter, the computing device 102 may determine whether to allow or deny access to computing device 102 based on confirming the nonce.

As discussed above, in some embodiments, the computing device 102 may be embodied as an automated teller machine (ATM) 102. In such embodiments, the ATM 102 may generate an authorization request packet in response to a user requesting access to one or more components or functions of the ATM 102. To do so, the ATM 102 may first generate an OTP and a nonce using, for example, one or more cryptographic algorithms. The ATM 102 then encrypts the OTP, the nonce, and a unique identifier of the ATM 102 to generate the authorization request packet.

In embodiments where the ATM 102 has limited or no access to the network 180, the ATM uses the mobile device 132 as a proxy to transmit the authorization request packet to the access control server 162. In those embodiments, the ATM 102 may encode or otherwise convert the authorization request packet into an NFC tag or a barcode, which may then be read or captured by the mobile device 132. Upon receiving the authorization request packet from the NFC tag or the barcode provided by the ATM 102, the mobile device 132 forwards the packet along with user credentials to the access control server 162 over the network 180.

The access control server 162 may then decrypt the authorization request packet and verify the information contained therein. If the information (i.e. the OTP, nonce, and unique identifier of the ATM 102) is verified, the access control server 162 re-encrypts the nonce to generate an authorization response packet for transmission to the ATM 102.

As discussed above, the ATM 102 has limited or no access to the network 180 in some embodiments. Similar to before, the mobile device 132 may be used as a proxy between the access control server 162 and the ATM 102. In such embodiments, the access control server 162 transmits the authorization response packet to the mobile device 132 over the network 180. The mobile device 132 may encode or otherwise convert the authorization response packet into an NFC tag or a barcode, which may then be read or captured by the ATM 102.

The ATM 102, in such embodiments, decrypts the authorization response packet to obtain the nonce that was re-encrypted by the access control server 162. To determine whether access to the one or more requested components or functions should be permitted, the ATM 102 may compare the nonce obtained from authorization response packet with the nonce that the ATM 102 originally generated. In such embodiments, the ATM 102 may allow the user to access the one or more requested components or functions if the nonces match.

Figure 3:
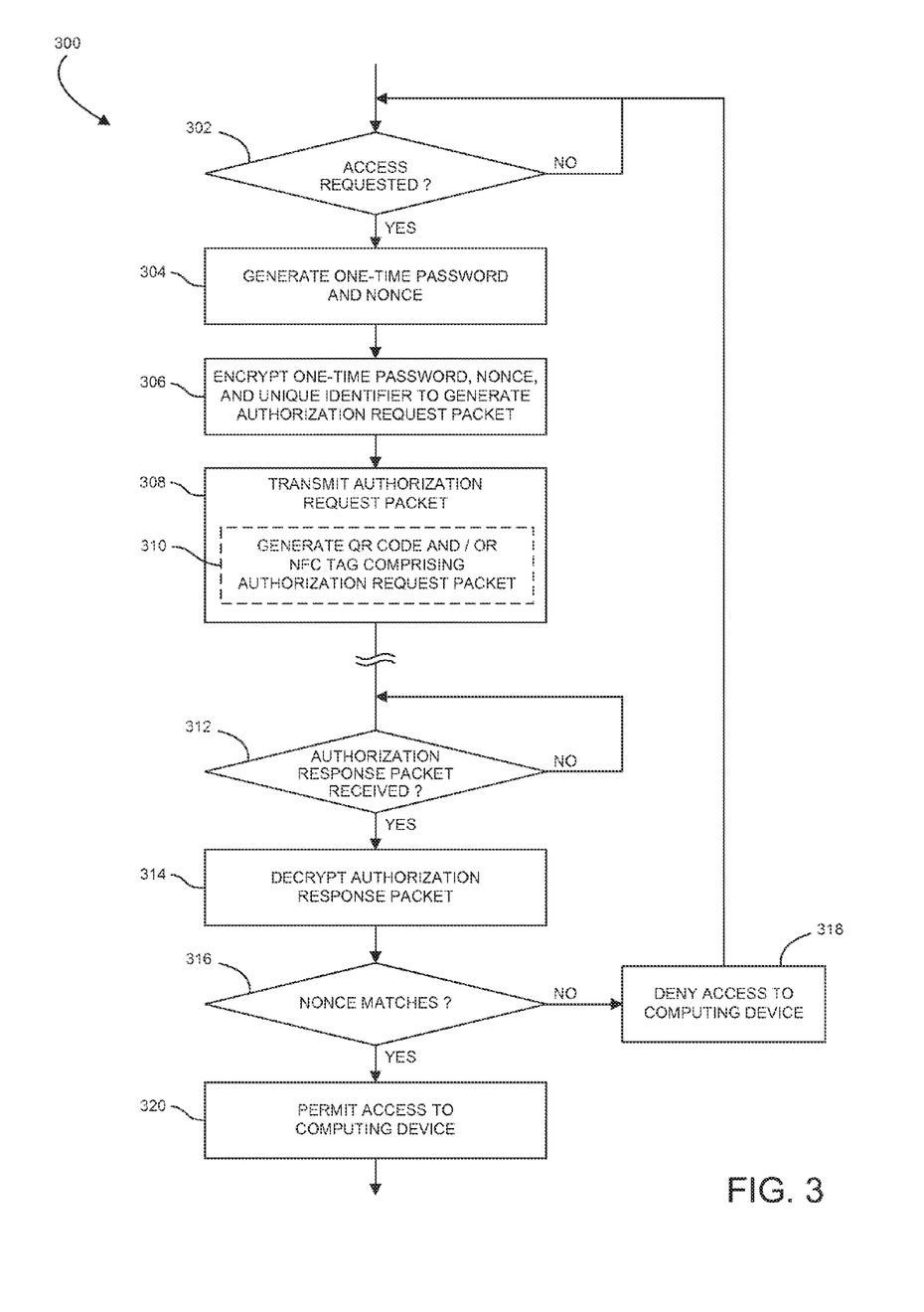
FIG. 3 is a simplified flow diagram of at least one embodiment of a method for extending distributed logon services performed by a computing device of FIGS. 1 and 2.

Referring now to FIG. 3, in use, the off-line computing device 102 may execute a method 300 for extending distributed logon services to the computing device 102. The method 300 begins with block 302 in which the computing device 102 determines whether a user is requesting access to the computing device 102. As discussed above, the user may request access to one or more components of the computing device 102 or to one or more functions or programs executing on the computing device 102. In response to determining the user is requesting access to the computing device 102, the method 300 advances to block 304.

In block 304, the computing device 102 generates a one-time password (OTP) as discussed above. To do so, the security engine (SE) 112 of the computing device 102 in some embodiments may use a suitable cryptographic algorithm to generate the OTP as a function of a seed provided to the computing device 102. Additionally, in order to prevent the OTP from being obtained by a malicious third party, the SE 112 may store the OTP, the algorithm, the seed, and/or any other related data in the secure memory 114 of the computing device 102. It should be understood that although only one algorithm is used by the SE 112 to generate the OTP in the described embodiment, more than one algorithm may be used by the SE 112 in other embodiments.

Additionally, in block 304, the computing device 102 may generate a nonce. The nonce may be embodied as a random or pseudorandom number. The computing device 102 may use a suitable cryptographic algorithm to generate the nonce as a function of a seed provided to the computing device 102. In the illustrative embodiment, the algorithm and seed used to generate the nonce are different from the algorithm and seed used to generate the OTP. Additionally, it should be understood that in the illustrative embodiment each nonce generated is used once by the computing device 102.

The computing device 102 may also be associated with a unique identifier. The unique identifier may be embodied as a number, alphanumeric string of characters, a word, or any other appropriate marking that uniquely identifies the computing device 102 from one or more other computing devices. For example, in some embodiments, the unique identifier may comprise a unique serial number associated with the computing device 102. In such embodiments, the data storage device 170 of the access control server 162 may store a mapping of unique serial numbers to computing devices.

Referring back to FIG. 3, in block 306, the computing device 102 may encrypt the OTP, the nonce, and the unique identifier using an encryption key 116 retrieved from the secure memory 114 to generate the authorization request packet. Additionally or alternatively, the computing device 102 may encrypt the OTP, the nonce, and the unique identifier using one or more encryption keys stored in the memory 166 and/or the data storage device 118 of the computing device 102 (which may be stored in those devices in an encrypted state). It should be understood that the computing device 102 may use any suitable encryption technique to encrypt the OTP, the nonce, and the unique identifier. For instance, the computing device 102 may use one or more symmetric key algorithms (i.e., shared keys), asymmetric key algorithms (i.e., public/private key pair), or any other suitable encryption mechanism to encrypt the OTP, the nonce, and the unique identifier and generate the authorization request packet. After encrypting the OTP, the nonce, and the unique identifier of the computing device 102 to generate the authorization request packet, the method 300 advances to block 308.

In block 308, the computing device 102 transmits the generated authorization request packet to the access control server 162 for authorization. In such embodiments, the computing device 102 uses the mobile device 132 as a proxy by first sharing the generated authorization request packet with the mobile device 132. To do so, the computing device 102 may generate, in block 310, an NFC tag or a barcode comprising the authorization request packet. In such embodiments, the computing device 102 may encode or otherwise convert the authorization request packet into the NFC tag or the barcode. It should be understood that the NFC tag generated by the computing device 102 may embodied as either a physical NFC tag or a "soft" NFC tag on the computing device 102. Additionally, the computing device 102 may encode the authorization request packet in any barcode format suitable for capture by the mobile device 132. For example, the computing device 102 may encode the authorization request packet as a 2D barcode such as a Quick Response (QR) code, or any other appropriate barcode format. The mobile device 132 may capture or otherwise receive the authorization request packet from the computing device 102, and retransmit the authorization request packet to the access control server 162 for authorization.

In block 312, the computing device 102 determines whether an authorization response packet has been received from the access control server 162. In some embodiments, the authorization response packet comprises the nonce generated by the computing device 102, but later re-encrypted by the access control server 162. Additionally, as discussed above, the access control server 162 uses the mobile device 132 as a proxy for transmission of the authorization response packet. To do so, the computing device 102 may use the camera 120 and/or the NFC circuitry 124 to capture and/or receive the authorization response packet from a barcode or NFC tag generated by the mobile device 132. Upon determining that the authorization packet has been received from the access control server 162 using the mobile device 132 as a proxy, the method 300 advances to block 314.

In block 314, the computing device 102 decrypts the authorization response packet to obtain the nonce. To do so, the computing device 102 uses the encryption key 116 or a corresponding encryption key retrieved from the secure memory 114. Additionally or alternatively, the computing device 102 may decrypt the authorization response packet using one or more encryption keys stored in the memory 166 and/or the data storage device 118 of the computing device 102. It should be understood that the computing device 102 may use any suitable decryption technique to decrypt the authorization response packet and obtain the nonce. For instance, the computing device 102 may use one or more symmetric key algorithms (i.e., shared keys), asymmetric key algorithms (i.e., public/private key pair), or any other suitable encryption mechanism to decrypt the authorization response packet and obtain the nonce. After decrypting the authorization response packet and obtaining the nonce, the method 300 advances to block 316.

In block 316, the computing device 102 may determine whether the nonce obtained from the decrypted authorization response packet matches the nonce originally generated by the computing device 102. In some embodiments, the originally generated nonce may be retrieved from the secure memory 114, the memory 108, or the data storage device 118. If the computing device 102, at block 316, determines that the nonce obtained from the decrypted authorization response packet matches the nonce that was originally generated by the computing device 102, the method 300 advances to block 320 in which access is permitted to the computing device 102. If, however, the computing device 102 at block 316 determines that the nonce obtained from the decrypted authorization response packet does not match the nonce that was originally generated by the computing device 102, the method 300 advances to block 318 in which access is denied to the computing device 102.

Figure 4:
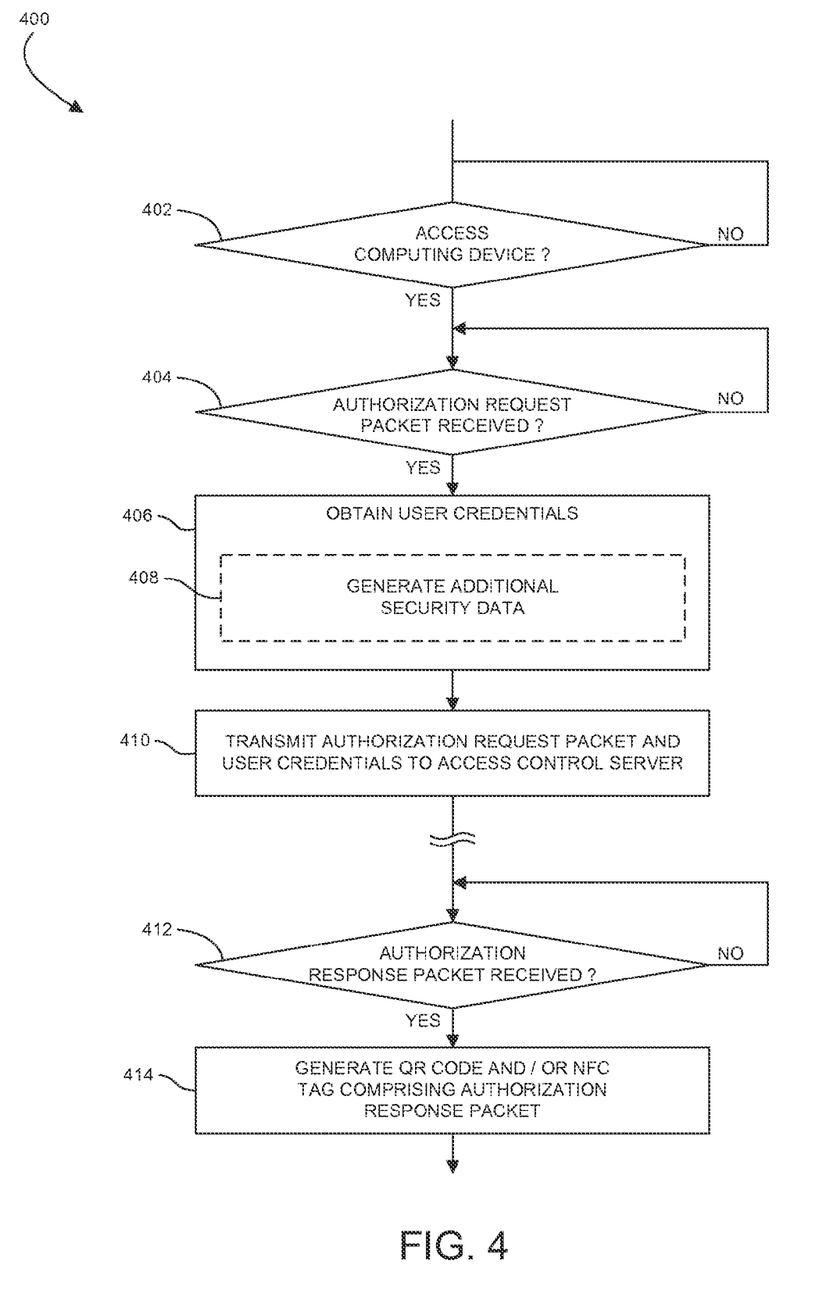
FIG. 4 is a simplified flow diagram of at least one embodiment of a method for extending distributed logon services performed by a mobile device of FIGS. 1 and 2.

As discussed above, the mobile device 132 is used as a proxy by the computing device 102. To do so, as shown in FIG. 4, the mobile device 132 may execute a method 400 for extending distributed logon services to the off-line computing device 102. The method 400 begins with block 402 in which the mobile device 132 determines whether the user is attempting to access the computing device 102. In such embodiments, the mobile device 132 may determine that the user is attempting to access the computing device 102 based on receiving an input from one or more of the peripheral devices 156 indicative of a request for access. For example, the mobile device 132 may determine that the user has pressed one or more keys of the mobile device, launched one or more applications for execution on the mobile device 132, and/or performed any other action indicative of the user's desire to access the computing device 102. If the mobile device 132, at block 402, determines that the user is attempting to access the computing device 102, the method 400 advances to block 404.

In block 404, the mobile device 132 determines whether an authorization request packet has been received from the computing device 102. As discussed above, the computing device 102 may generate an authorization request packet in response to determining that the user is attempting to access one or more components, functions, and/or programs of the computing device 102. The mobile device 132 may use the camera 150 and/or the NFC circuitry 154 to capture and/or receive the authorization request packet from a barcode or NFC tag generated by the computing device 102. After determining that an authorization request packet has been received, the method 400 advances to block 406.

In block 406, the mobile device 132 obtains user credentials from the user requesting access to the computing device 102. For example, the mobile device 132 may obtain a user name and a password of the user in some embodiments. Additionally or alternatively, in other embodiments, the mobile device 132 may obtain a personal identification number (PIN) from the user. The user credentials may be obtained from the user via one or more of the peripheral devices 156 (i.e., keypads, touch screens, voice recognition components, etc.) of the mobile device 132. In block 408, the mobile device 132 may also generate additional security data in some embodiments to be associated with the access request of the user. For example, the mobile device 132 may generate a location (i.e., latitude and longitude, city, state, country, etc.) of the mobile device 132. In such embodiments, the peripheral devices 156 of the mobile device 132 may also comprise location circuitry (i.e., Global Positioning System (GPS) circuitry, RF triangulation circuitry, etc.) for determining a location of the mobile device 132. Additionally or alternatively, the mobile device 132 may generate the date and/or time that the user requested access to the computing device 102.

In block 410, after obtaining the user credentials and any other security data, the mobile device 132 transmits the authorization request packet received from the computing device 102 along with the user credentials and security data to the access control server 162. In such embodiments, the mobile device 132 transmits the authorization request packet, user credentials, and any security data to the access control server 162 over the network 180. The method 400 then advances to block 412.

In block 412, the mobile device 132 determines whether an authorization response packet has been received from the access control server 162 over the network 180. If the mobile device 132 determines that an authorization response packet has been received from the access control server 162, the method 400 advances to block 414.

In block 414, the mobile device 132 may generate an NFC tag or a barcode comprising the authorization response packet. In such embodiments, the mobile device 132 may encode or otherwise convert the authorization response packet into the NFC tag or the barcode. It should be understood that the NFC tag generated by the mobile device 132 may embodied as either a physical NFC tag or a "soft" NFC tag on the mobile device 132. Additionally, the mobile device 132 may encode the authorization response packet in any barcode format suitable for capture by the mobile device 132. For example, the mobile device 132 may encode the authorization response packet as a 2D barcode such as a Quick Response (QR) code, or any other appropriate barcode format. The computing device 102 may capture or otherwise receive the authorization response packet from the mobile device 132.

Figure 5:
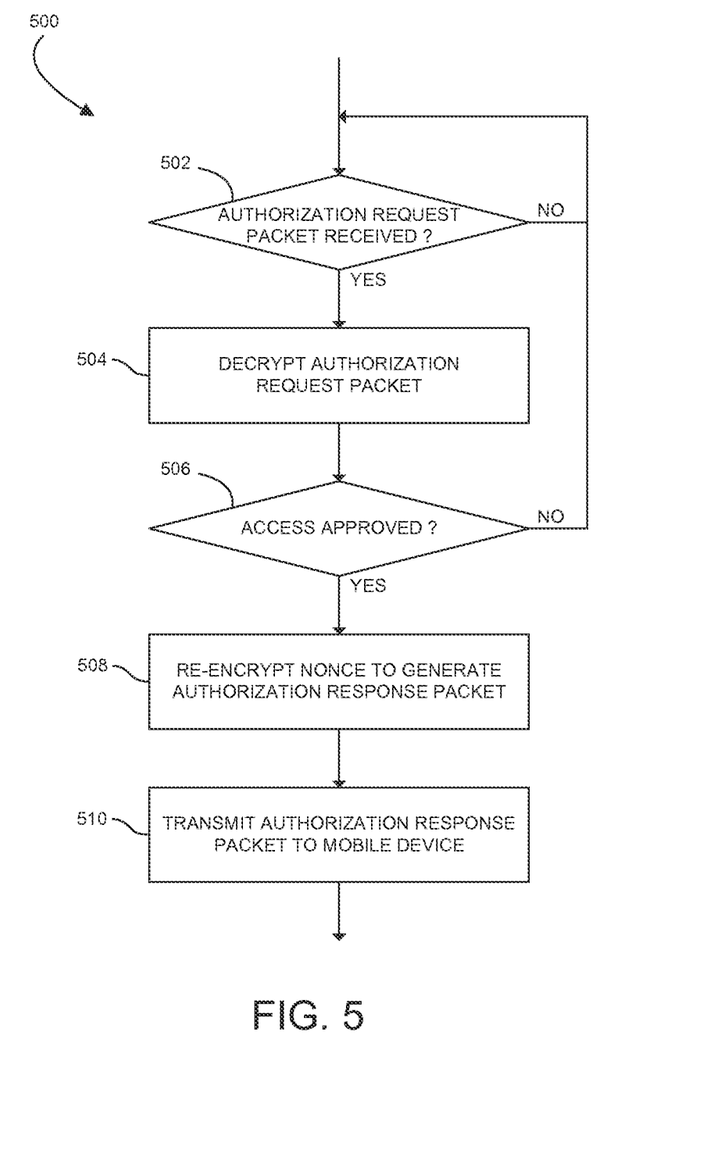
FIG. 5 is a simplified flow diagram of at least one embodiment of a method for extending distributed long services performed by an access control server of FIGS. 1 and 2.

Referring now to FIG. 5, in use, the access control server 162 may execute a method 500 for extending distributed logon services to the off-line computing device 102. The method 500 begins with block 502 in which the access control server 162 determines whether an authorization request packet has been received from the computing device 102. In some embodiments, the authorization request packet comprises the OTP generated by the computing device 102, the nonce generated by the computing device 102, and the unique identifier of the computing device 102. As discussed above, the computing device 102 uses the mobile device 132 as a proxy for transmission of the authorization request packet to the access control server 162. As such, the access control server 162 may determine whether the mobile device 132 retransmitted the authorization request packet over the network 180. Upon determining that the authorization request packet has been received from the computing device 102 using the mobile device 132 as a proxy, the method 500 advances to block 504.

In block 504, the access control server 162 decrypts the authorization request packet using an encryption key to obtain the OTP, the nonce, and the unique identifier of the computing device 102. It should be understood that the encryption key used to decrypt the authorization request packet corresponds to the encryption key that was used to encrypt the authorization request packet. The method 500 then advances to block 506.

In block 506, the access control server 162 determines whether the user should be provided access to the computing device 102. To do so, the access control server 162 verifies the OTP and the unique identifier of the computing device 102 obtained from the authorization request packet. In some embodiments, the access control server 162 may include a security engine (SE) or other secure execution environment. The SE or other secure execution environment of such embodiments may use the same or a corresponding cryptographic algorithm and seed to generate an OTP on the access control server 162 that corresponds to the OTP generated by the computing device 102. As such, using the platform identifier, the access control server 162 may determine whether the OTP obtained from the authorization request packet matches the OTP generated on the access control server 162. In some embodiments, the access control server 162 may determine that the user should not be permitted to access the computing device 102 if the OTP obtained from the authorization request packet does not match the OTP generated by the access control server 162. If, however, the OTP obtained from the authorization request packet matches the OTP generated by the access control server 162, the access control server 162 may determine that the user should be provided access to the computing device 102.

Additionally, as discussed above, the mobile device 132 may transmit the authorization request packet along with the user credentials obtained from the user. As such, the access control server 162 may also verify that the user is authorized to access the computing device 102. In operation, the access control server 162 may compare the user credentials to one or more corresponding user credentials stored in the data storage device 170. For example, the access control server 162 may compare a user name and a password inputted by the user on the mobile device 132 and later received by the access control server 162 with a corresponding user name and password stored in the data storage device 170. In some embodiments, the access control server 162 may determine that the user should not be permitted to access the computing device 102 if the user credentials obtained by the mobile device 132 do not match the user credentials stored in the data storage device 170 of the access control server 162. In other embodiments, the access control server 162 may determine that a user should be permitted to access the computing device 102 if the user credentials obtained by the mobile device 132 match the user credentials stored in the storage device 170 of the access control server 162.

Additionally or alternatively, as previously discussed, the mobile device 132 may also transmit additional security data associated with the access request to the access control server 162. In operation, the access control server 162 may determine whether the additional security data complies with one or more access security policies set by an administrator of the computing device 102. For example, the access control server 162 may determine whether a particular user is permitted to access the computing device 102 at a specific time of day, from a specific location, within a reference proximity of the computing device 102, or based on any other access security policy corresponding to the usage of the computing device 102.

Returning back to block 506, if the access control server 162 determines that the user should not be permitted to access to the computing device 102, the method 500 loops back to block 502. If, however, the access control server 162 determines that the user should be permitted to access to the computing device 102, the method 500 advances to block 508.

At block 508, the access control server 162 re-encrypts the nonce generated by the computing device 102 in response to determining that the user is authorized to access the computing device 102. In operation, the access control server 162 re-encrypts the nonce using an encryption key to generate an authorization response packet. It should be understood that the encryption key used to re-encrypt the nonce may be a corresponding key or a different key than the encryption key used to encrypt the OTP, the nonce, and the unique identifier of the computing device 102. The method 500 then advances to block 510.

In block 510, after re-encrypting the nonce, the access control server 162 transmits the generated authorization response packet to the computing device 102. As discussed above, the access control server 162 transmits the authorization response packet to the computing device 102 using the mobile device 132 as a proxy. To do so, the access control server 162 transmits the authorization response packet to the mobile device 132 over the network 180. Thereafter, the mobile device 132 shares the generated authorization response packet with the computing device 102 using a barcode and/or one or more NFC data exchanges.

While the disclosure has been illustrated and described in detail in the drawings and foregoing description, such an illustration and description is to be considered as exemplary and not restrictive in character, it being understood that only illustrative embodiments have been shown and described and that all changes and modifications consistent with the disclosure and recited claims are desired to be protected.

The invention claimed is:

1. A computing device comprising:
 a Security Engine (SE) to generate a one-time password (OTP) and a nonce;
 a processor;
 at least one machine readable media comprising a plurality of instructions, which response to execution by the processor, causes the processor to:
 encrypt the OTP, the nonce, and a unique identifier of the computing device to generate an authorization request packet;
 share the authorization request packet with a mobile device;
 receive an authorization response packet forwarded by the mobile device, the authorization response packet comprises the nonce re-encrypted by an access control server;
 decrypt the authorization response packet encrypted by the access control server; and
 determine whether to permit or deny access to the computing device as a function a determination of whether the nonce re-encrypted by the access control server matches the nonce generated by the computing device.

2. The computing device of claim 1, wherein to share the authorization request packet with a mobile device comprises to encode the authorization request packet to generate a Quick Response (QR) code.

3. The computing device of claim 2, wherein to share the authorization request packet with a mobile device comprises to display the QR code on the computing device for capture by the mobile device.

4. The computing device of claim 1, wherein to share the authorization request packet with a mobile device comprises to encode the authorization request packet to generate a near-field communication (NFC) tag on the computing device, the authorization request packet stored within the NFC tag.

5. The computing device of claim 4, wherein to share the authorization request packet with a mobile device comprises to transmit the authorization request packet stored within the NFC tag in response to a touch by the NFC circuitry of the mobile device with the NFC tag of the computing device.

6. The computing device of claim 1, wherein access to the computing device is at least one of: (i) permitted in response to a determination that the nonce re-encrypted by the access control server matches the nonce generated by the computing device, or (ii) denied in response to a determination that the nonce re-encrypted by the access control server does not match the nonce generated by the computing device.

7. At least one non-transitory, machine readable media comprising a plurality of instructions, which in response to execution by a computing device, cause the computing device to:
 generate a one-time password (OTP) and a nonce;
 encrypt the OTP, the nonce, and a unique identifier of the computing device to generate an authorization request packet;
 share the authorization request packet with a mobile device;
 receive an authorization response packet forwarded by the mobile device, the authorization response packet comprises the nonce re-encrypted by an access control server;
 decrypt the authorization response packet encrypted by the access control server; and
 determine whether to permit or deny access to the computing device as a function of a determination of whether the nonce re-encrypted by the access control server matches the nonce generated by the computing device.

8. The at least one non-transitory, machine readable media of claim 7, wherein to share the authorization request packet with a mobile device comprises to encode the authorization request packet to generate a Quick Response (QR) code.

9. The at least one non-transitory, machine readable media of claim 8, wherein to share the authorization request packet with a mobile device comprises to display the QR code on the computing device for capture by the mobile device.

10. The at least one non-transitory, machine readable media of claim 7, wherein to share the authorization request packet with a mobile device comprises to encode the authorization request packet to generate a near-field communication (NFC) tag on the computing device, the authorization request packet stored within the NFC tag.

11. The at least one non-transitory, machine readable media of claim 10, wherein to share the authorization request packet with a mobile device comprises to transmit the authorization request packet stored within the NFC tag in response to a touch by the NFC circuitry of the mobile device with the NFC tag of the computing device.

12. The at least one non-transitory, machine readable media of claim 7, wherein access to the computing device is at least one of: (i) permitted in response to a determination that the nonce re-encrypted by the access control server matches the nonce generated by the computing device, or (ii) denied in response to a determination that the nonce re-encrypted by the access control server does not match the nonce generated by the computing device.

13. The at least one non-transitory, machine readable media of claim 7, wherein to generate a one-time password (OTP) and a nonce comprises to generate the OTP in a Security Engine (SE) of the computing device.

14. The at least one non-transitory, machine readable media of claim 7, wherein the plurality of the instructions further cause the computing device to retrieve, with a Security Engine (SE) of computing device, an encryption key of the computing device and an encryption key of the access control server from a secure memory store of the computing device, the secure memory store is accessible to the SE and inaccessible to other components of the computing device.

15. A method comprising:
generating, in a Security Engine (SE) of a computing device, a one-time password (OTP) and a nonce;
encrypting, on the computing device, the OTP, the nonce, and a unique identifier using an encryption key of the computing device to generate an authorization request packet, the encryption key of the computing device stored in a secure memory of the computing device, the secure memory of the computing device accessible to the SE and inaccessible to other components of the computing device;
sharing, on the computing device, the authorization request packet with a mobile device;
receiving, on the computing device, an authorization response packet forwarded by the mobile device, the authorization response packet comprises the nonce re-encrypted with an encryption key of an access control server;
decrypting, on the computing device, the authorization response packet with the encryption key of the access control server to obtain the nonce re-encrypted by the access control server, the encryption key of the access control server stored in the secure memory; and
determining, on the computing device, whether to permit or deny access to the computing device as a function of determining whether the nonce re-encrypted by the access control server matches the nonce originally generated by the computing device.

16. The method of claim 15, wherein sharing the authorization request packet with a mobile device comprises generating at least one of a Quick Response (QR) code or a near-field communication (NFC) tag having the authorization request packet stored therein.

17. The method of claim 15, wherein receiving an authorization response packet forwarded by the mobile device comprises capturing a Quick Response (QR) code generated and displayed by the mobile device, the QR code comprising the authorization response packet encoded therein.

18. The method of claim 15, wherein receiving an authorization response packet forwarded by the mobile device comprises receiving the authorization response packet from a near-filed communication (NFC) tag generated by the mobile device in response to NFC circuitry of the computing device touching the NFC tag generated by the mobile device.

* * * * *